(12) United States Patent
Pigott (10) Patent No.: US 7,880,457 B2
(45) Date of Patent: Feb. 1, 2011

(54) DUAL-LOOP DC-TO-DC CONVERTER APPARATUS

(75) Inventor: John M. Pigott, Phoenix, AZ (US)

(73) Assignee: Freescale semiconductor, Inc., Austin, TX (US)

( * ) Notice: Subject to any disclaimer, the term of this patent is extended or adjusted under 35 U.S.C. 154(b) by 317 days.

(21) Appl. No.: 12/242,145

(22) Filed: Sep. 30, 2008

(65) Prior Publication Data

US 2010/0079126 A1   Apr. 1, 2010

(51) Int. Cl.
G05F 1/40 (2006.01)
G05F 1/10 (2006.01)
(52) U.S. Cl. ...................................... 323/285; 323/222
(58) Field of Classification Search ......... 323/222–225, 323/282, 284, 285
See application file for complete search history.

(56) References Cited

U.S. PATENT DOCUMENTS

| | | | |
|---|---|---|---|
| 5,770,940 A * | 6/1998 | Goder | 323/282 |
| 6,809,504 B2 * | 10/2004 | Tang et al. | 323/274 |
| 7,116,087 B2 * | 10/2006 | Zhang et al. | 323/272 |
| 7,554,310 B2 * | 6/2009 | Chapuis et al. | 323/282 |
| 2009/0295343 A1 * | 12/2009 | Chiu | 323/234 |

OTHER PUBLICATIONS

Plante, J., Focus: DC-to-DC Converters, eFlash Spotlight, News Flash, NASA, Dec. 2003.
DC/DC power modules basics, Ericsson Power Modules, Design Notes, EN/LZT, 146 228 R1D, Jan. 2007.

* cited by examiner

*Primary Examiner*—Matthew V Nguyen
(74) *Attorney, Agent, or Firm*—Ingrassia Fisher & Lorenz, P.C.

(57) ABSTRACT

A dual loop DC-to-DC converter is provided that includes a first control loop that maintains a DC output voltage ($V_{OUT}$) less than or equal to a desired maximum value of the $V_{OUT}$, a second control loop that operates simultaneously with the first control loop and maintains a DC input voltage ($V_{IN}$) greater than or equal to a desired minimum value of the $V_{IN}$, and a duty cycle selection module. The first control loop generates a first clock signal having a first duty cycle, and the second control loop generates a second clock signal having a second duty cycle. The duty cycle selection module continuously determines which one of the first duty cycle and the second duty cycle has a lower duty cycle value, and continuously generates a PWM output signal having a modulated duty cycle equal to the lower duty cycle value.

20 Claims, 3 Drawing Sheets

DUAL-LOOP DC-TO-DC CONVERTER APPARATUS

TECHNICAL FIELD

Embodiments of the subject matter described herein relate generally to DC-to-DC converters. More particularly, embodiments of the subject matter relate to DC-to-DC converters that regulate input voltage and output voltage.

BACKGROUND

A DC-to-DC converter is a circuit or device which converts DC power from one voltage to another voltage. A DC-to-DC converter accepts a DC input voltage ($V_{IN}$) from a power source and produces a DC output voltage ($V_{OUT}$) for use by a load. Typically the DC output voltage ($V_{OUT}$) produced is at a different voltage level than the DC input voltage ($V_{IN}$). For instance, a DC-to-DC converter may convert a relatively low input battery voltage ($V_{IN}$) to a higher DC output voltage ($V_{OUT}$), or vice versa, and in some cases converts the input battery voltage ($V_{IN}$) to a negative DC output voltage ($V_{OUT}$). A normal DC-to-DC converter typically uses feedback about the DC output voltage ($V_{OUT}$) to regulate the DC output voltage ($V_{OUT}$).

Figure 1:
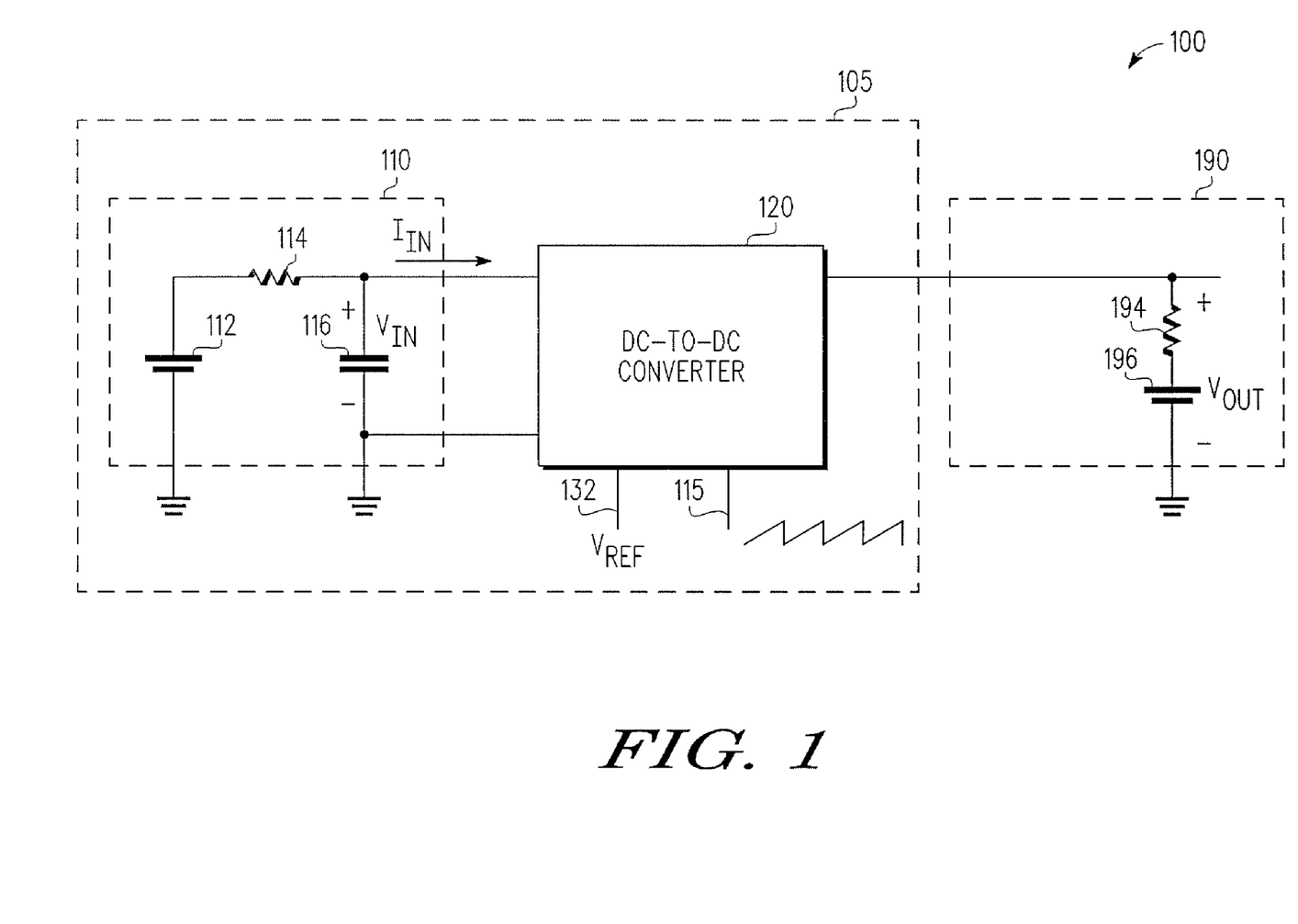
FIG. 1 is a circuit schematic which illustrates a system that includes a circuit for supplying an output voltage ($V_{OUT}$) to a load.

In some applications, the load will consume as much input current ($I_{IN}$) from the power source as it requires to supply an output voltage ($V_{OUT}$), and the power source will provide as much power as needed to supply this input current ($I_{IN}$). One such example is illustrated in FIG. 1 which is a circuit schematic that illustrates a circuit 105 for supplying an output voltage ($V_{OUT}$) to a load 190. The circuit 105 includes a fuel cell 110 coupled to a DC-to-DC converter 120. The DC-to-DC converter 120 receives a DC input voltage ($V_{IN}$) from the fuel cell 110 and converts it to a DC output voltage ($V_{OUT}$) for use by the load 190.

The fuel cell 110 is represented by a voltage source 112 having a relatively high series resistance 114 and capacitance 116. The fuel cell 110 provides an input voltage ($V_{IN}$) across capacitance 116. The value of the input voltage ($V_{IN}$) is equal to the difference between a voltage 112 of the fuel cell 110 and the voltage drop across series resistance 114. The series resistance 114 is "high" relative to the voltage source 112 since product of the input current ($I_{IN}$) and series resistance 114 can be up to fifty percent (50%) of the voltage source 112. The load 190 is represented as load resistance 194 in series with a load voltage 196. An output voltage ($V_{OUT}$) provided across the load resistance 194 and load voltage 196 provides power to the load 190. The resistance value of load resistor 194 may vary with the state of the load.

The DC-to-DC converter 120 receives a variable input voltage ($V_{IN}$) and "ideally" regulates the value of output voltage ($V_{OUT}$) so that the output voltage ($V_{OUT}$) remains as close as possible to a desired value specified by a reference voltage ($V_{REF}$) 132.

When the load 190 is powered, the DC-to-DC converter 120 will attempt to supply as much power as needed to supply the load 190 with the desired output voltage ($V_{OUT}$). As the input current ($I_{IN}$) drawn by the DC-to-DC converter 120 increases, the voltage drop across the input series resistance 114 also increases, and therefore the input voltage ($V_{IN}$) to the DC-to-DC converter 120 decreases. In some situations, the load 190 attempts to consume more input power than is available from the fuel cell 110. If the input current drawn by the load 190 becomes very high, then the input voltage ($V_{IN}$) will drop so much that output power available to the load 190 will actually decrease despite the fact that the load 190 is actually drawing more input current ($I_{IN}$). As a result, the output voltage ($V_{OUT}$) can fall below a desired value (e.g., less than reference voltage ($V_{REF}$) 132). This problem is exacerbated by the fact that the fuel cell 110 has a relatively high series input resistance 114 in comparison to the power delivered.

For instance, consider an example where the output voltage ($V_{OUT}$) is to be regulated at 5.0 volts, the source voltage 112 of the fuel cell 110 is 0.9 volts, the reference voltage ($V_{REF}$) is 5 volts, and the fuel cell's internal resistance 114 is 0.125 ohm. When the load resistance 194 is at 25 ohms, the load current is 200 milliamperes, and the load 190 consumes a total output power ($P_{OUT}$) of 1 watt. Assuming 90% efficiency, the input power ($P_{IN}$) would be 1/0.9=1.11 watts, which means that the fuel cell 110 must provide an input current of 1.58 amperes at an input voltage is 0.70 volts. The fuel cell 110 can supply this amount of input power. However, the load resistance 194 may change. For example, if the load resistance 194 decreases to 12.5 ohms, then the output power ($P_{OUT}$) needed to maintain the same 5 volt output voltage ($V_{OUT}$) at the load increases to 2 watts, which would require 2.22 watts of input power ($P_{IN}$) from the fuel cell 110. Even though the fuel cell 110 cannot supply this much input power, the load 190 will nevertheless attempt to consume more input current ($I_{IN}$), which in turn causes the input voltage ($V_{IN}$) to decrease further. As a result, the system becomes unstable and is unable to deliver power efficiently. This point occurs when the voltage supplied by the fuel cell 110 to the DC-to-DC converter 120 falls to one-half of the unloaded value. Beyond this point, the power delivered to the DC-to-DC converter 120 actually decreases as the input current ($I_{IN}$) increases, and also consumes excessive current from the fuel cell 112.

Thus, although the DC-to-DC converter 120 can regulate the amount of power consumed from the fuel cell 110 to provide a desired value of the output voltage ($V_{OUT}$), there is no mechanism for simultaneously preventing the input voltage ($V_{IN}$) from falling below a value capable of providing the desired output power ($P_{OUT}$).

Accordingly, it is desirable to provide an improved DC-to-DC converter designed to prevent the input voltage ($V_{IN}$) of a power source from decreasing so much that the input voltage ($V_{IN}$) falls below a minimum desired value. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the invention or the application and uses of the invention. The word "exemplary" is used herein to mean "serving as an example, instance, or illustration." Any embodiment described herein as "exemplary" is not necessarily to be construed as preferred or advantageous over other embodiments. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element.

Figure 2:
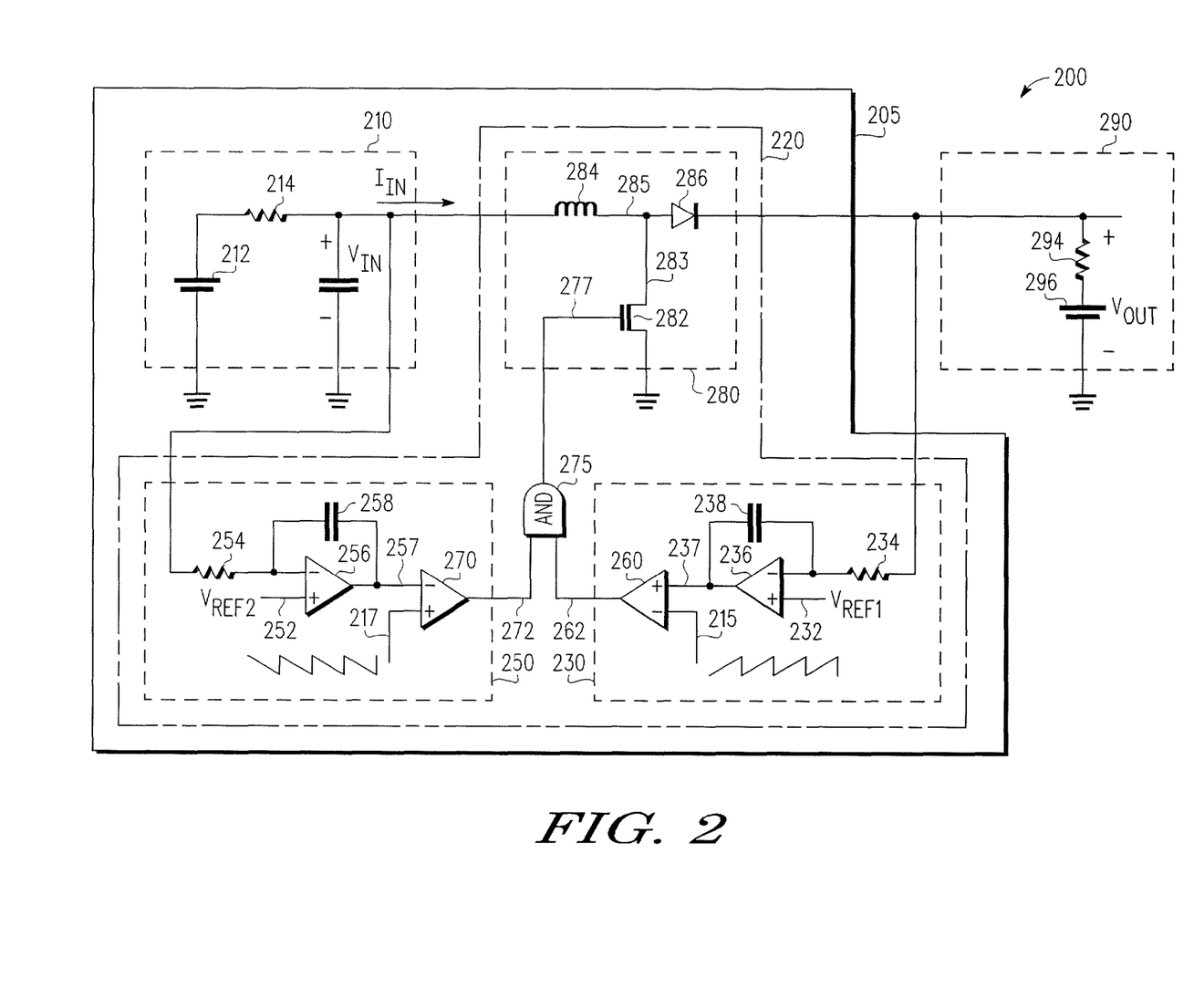
FIG. 2 is a circuit schematic which illustrates a system that includes a circuit for supplying an output voltage ($V_{OUT}$) to a load in accordance with an exemplary embodiment of the present invention.

The connecting lines shown in the various figures contained herein are intended to represent example functional relationships and/or physical couplings between the various elements. It should be noted that many alternative or additional functional relationships or physical connections may be present in other embodiments of the subject matter. The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics illustrated in FIGS. 1 and 2 depict an exemplary arrangement of elements, additional intervening elements, devices, features, or components may be present in embodiments of the depicted subject matter.

Overview of Exemplary Embodiments

Embodiments of the present invention generally relate to techniques for converting a DC input voltage ($V_{IN}$) to a DC output voltage ($V_{OUT}$). In accordance with these techniques an apparatus generates a first pulse width modulated (PWM) clock signal and a second PWM clock signal. The first PWM clock signal has a first duty cycle associated therewith and the second PWM clock signal has a second duty cycle associated therewith. The apparatus continuously determines which one of the first duty cycle and the second duty cycle has a lower duty cycle value, and generates a PWM output signal having a modulated duty cycle equal to the lower duty cycle value. The PWM output signal can be used to concurrently maintain the output voltage ($V_{OUT}$) at less than or equal to a desired maximum value of the output voltage ($V_{OUT}$) and maintain the input voltage ($V_{IN}$) at greater than or equal to a desired minimum value of the DC input voltage ($V_{IN}$).

In one exemplary embodiment, a system is provided that includes a DC power source that provides a DC input voltage ($V_{IN}$), a dual loop DC-to-DC converter coupled to the DC power source and designed to convert the DC input voltage ($V_{IN}$) to a DC output voltage ($V_{OUT}$), and a load coupled to the dual loop DC-to-DC converter and designed to receive the DC output voltage ($V_{OUT}$). The dual loop DC-to-DC converter includes a first reference voltage ($V_{REF1}$) input that represents a desired maximum value of the output voltage ($V_{OUT}$), a second reference voltage ($V_{REF2}$) input represents a desired minimum value of the input voltage ($V_{IN}$), a first control loop that maintains the output voltage ($V_{OUT}$) less than or equal to the first reference voltage ($V_{REF1}$) input, a second control loop that operates concurrently with the first control loop and maintains the input voltage ($V_{IN}$) greater than or equal to the second reference voltage ($V_{REF2}$) input, and a duty cycle selection module.

The first control loop generates a first pulse width modulated (PWM) clock signal having a first duty cycle associated therewith, and the second control loop generates a second PWM clock signal having a second duty cycle associated therewith. The duty cycle selection module continuously determines which one of the first duty cycle of the first PWM clock signal and the second duty cycle of the second PWM clock signal has a lower duty cycle value, and continuously generates a PWM output signal having a modulated duty cycle equal to the one of the first duty cycle and the second duty cycle that is determined to have the lower duty cycle value. When the duty cycle selection module determines that the first duty cycle of the first PWM clock signal has the lower duty cycle value, the modulated duty cycle of the PWM output signal is equal to the first duty cycle and the first control loop reduces the output voltage ($V_{OUT}$) to maintain the output voltage ($V_{OUT}$) below the first reference voltage ($V_{REF1}$) input. By contrast, when the second duty cycle of the second PWM clock signal has the lower duty cycle value, the modulated duty cycle of the PWM output signal is equal to the second duty cycle such that the second control loop regulates input current ($I_{IN}$) to prevent the input voltage ($V_{IN}$) from decreasing below the second reference voltage ($V_{REF2}$). The second control loop allows the first control loop to decrease the output voltage ($V_{OUT}$) to prevent the input voltage ($V_{IN}$) from decreasing below the second reference voltage ($V_{REF2}$).

In one exemplary implementation, the duty cycle selection module is an AND gate that performs an AND operation on the first PWM clock signal and the second PWM clock signal and automatically generates the PWM output signal having a modulated duty cycle equal to the one of the first duty cycle of the first PWM clock signal and the second duty cycle of the second PWM clock signal that has the lower duty cycle value.

Exemplary Embodiments

FIG. 2 is a circuit schematic which illustrates a system 200 that includes a circuit 205 for supplying an output voltage ($V_{OUT}$) to a load 290 in accordance with an exemplary embodiment of the present invention. The circuit 205 includes a DC power source 210 coupled to a dual loop DC-to-DC converter 220. The dual loop DC-to-DC converter 220 is coupled to a load 290.

The DC power source 210 can generally be any power source that provides an input voltage ($V_{IN}$). In one exemplary implementation, the DC power source 210 can be, for example, a fuel cell such as a battery (e.g., an AA battery) or a solar/photovoltaic cell. The DC power source 210 is represented by a voltage source 212 having a series resistance 214 and output capacitance 216. The DC power source 210 provides an input voltage ($V_{IN}$) that is used as a power source to charge the load 290. The value of the input voltage ($V_{IN}$) is equal to the difference between a voltage source 212 of the power source 210 and the voltage drop across series resistance 214 that is caused by the input current ($I_{IN}$) flowing from the voltage source 212. The DC power source 210 has relatively high series resistance 214 relative to the voltage source 212 and input current ($I_{IN}$) such that if the load 290 draws excessive input current ($I_{IN}$) from the DC power source 210, the input voltage ($V_{IN}$) will decrease significantly and sufficient input power cannot be provided to the load 290. In addition, power will be delivered inefficiently by the source 210, wasting a substantial portion of the total power in the series resistance 214.

The load 290 can generally be any device that is coupled a DC output voltage ($V_{OUT}$) generated by the dual loop DC-to-DC converter 220 from a DC power source. In one exemplary implementation, the load 290 can be, for example, a rechargeable battery such as a Li-Ion battery cell. The load 290 is represented as with a load resistance 294 in series with a load voltage ($V_{LOAD}$) 296. The load 290 has a terminal voltage ($V_{OUT}$) that serves as a power supply that charges the load 290. The values of the load voltage 296 and load resistance 294 change as the load 290 receives energy from the DC power source 210. For example, when the load 290 is a battery, its load voltage 296 varies depending on the amount of charge stored in the load 290.

The dual loop DC-to-DC converter 220 is designed to receive the input voltage ($V_{IN}$) from the DC power source 210 and to provide the output voltage ($V_{OUT}$) to the load 290. The DC-to-DC converter 220 includes a sawtooth signal input 215, a first reference voltage ($V_{REF1}$) input 232 that represents a desired maximum value of the output voltage ($V_{OUT}$), a second reference voltage ($V_{REF2}$) input 252 that represents a desired minimum value of the input voltage ($V_{IN}$), a first control loop 230, a second control loop 250, a duty cycle selection module 275, and an output power switch stage circuit 280. The first control loop 230 and the second control loop 250 each function as a DC-to-DC converter control loop and can be made from similar components, but operate differently as described below.

The duty cycle selection module 275 may be any circuit(s), device(s), or other module(s) that can continuously or repeatedly determine which one of two input signals has a lower duty cycle value, and generates a pulse width modulated output signal having a modulated duty cycle equal to the lower duty cycle value. For purposes of the description that follows, one exemplary embodiment will be described where the duty cycle selection module 275 is implemented using an AND logic gate (referred to herein simply as an "AND gate"). As used herein, an AND gate is a digital logic gate that implements logical conjunction (i.e., a high output (1) results only if both the inputs to the AND gate are high (1), and if neither or only one input to the AND gate is high, a low output results). An AND gate encompasses different NMOSFET and PMOSFET circuits used to implement an AND gate. However, those skilled in the art will appreciate that the duty cycle selection module 275 can be implemented using other circuit (s), device(s), or other module(s) that can select one of two input signals having a lower duty cycle value, and then output a PWM signal having the lower duty cycle value. For example, different logic gates or combinations of logic gates can be used so long as they perform an equivalent function. For instance, one alternative equivalent implementation of the duty cycle selection module 275 would be using a combination of NOR gates and/or NAND gates to implement an AND function. Another alternative equivalent implementation of the duty cycle selection module 275 would be using a NOR gate with the plus (+) and minus (−) terminals of the comparators 260, 270 inverted.

The first control loop 230 is designed to maintain or regulate the output voltage ($V_{OUT}$) at a value that is less than or equal to the first reference voltage ($V_{REF1}$) input 232. More specifically, the first control loop 230 regulates the output voltage ($V_{OUT}$) by consuming an amount of power from the DC power source 210 that is needed to maintain the output voltage ($V_{OUT}$) at a value that is less than or equal to the first reference voltage ($V_{REF1}$) input 232. One input of the first control loop 230 is coupled to a diode 286 of the output power switch stage circuit 280 so that the first control loop 230 receives feedback regarding the output voltage ($V_{OUT}$), another input of the first control loop 230 is coupled to the first reference voltage ($V_{REF1}$) input 232, and another input of the first control loop 230 receives the sawtooth waveform input signal 215. The sawtooth waveform input signal 215 cyclically ramps upward as time progresses and then sharply drops. One period of the sawtooth waveform input signal 215 corresponds to a clock cycle that starts when the sawtooth waveform input signal 215 begins rising upward and ends when the sawtooth waveform input signal 215 sharply drops. The output 262 of the first control loop 230 is coupled to AND gate 275. As explained below, the output signal 262 is a pulse width modulated (PWM) clock signal 262 (i.e., a square wave clock signal) that has a first duty cycle associated therewith.

In the exemplary implementation illustrated in FIG. 2, the first control loop 230 includes an error amplifier circuit 234, 236, 238 that is coupled to a duty cycle generator 260. In this exemplary implementation, the error amplifier circuit 234, 236, 238 includes an operational amplifier 236 with stability compensation component(s) 238, but can be implemented using other error amplifier circuits that are known in the art. Similarly, although the duty cycle generator 260 is illustrated as a comparator, the duty cycle generator 260 can also be implemented using other circuits that are known in the art for comparing two input signals.

The error amplifier circuit 234, 236, 238 is designed to receive the output voltage ($V_{OUT}$) and the first reference voltage ($V_{REF1}$) input 232. The first reference voltage ($V_{REF1}$) input 232 represents a desired value of the output voltage ($V_{OUT}$). In one implementation, the first reference voltage ($V_{REF1}$) input 232 is set to a value greater than an open circuit voltage of the load 290 to ensure that the load 290 charges. Based on the output voltage ($V_{OUT}$) and the first reference voltage ($V_{REF1}$) input 232, the error amplifier circuit 234, 236, 238 generates a first error voltage signal 237.

More specifically, the first error voltage signal 237 is determined based on the "differences" between the output voltage ($V_{OUT}$) and the first reference voltage ($V_{REF1}$) 232 during the operation of the circuit 200, where the differences can be based on all previous time values of the output voltage ($V_{OUT}$) and the first reference voltage ($V_{REF1}$) 232 during the operation of the circuit 200.

The duty cycle generator 260 continuously compares the first error voltage signal 237 to the sawtooth waveform input signal 215 and continuously generates a first PWM clock signal 262 (i.e., a square wave signal). The first PWM clock signal has a first duty cycle associated therewith that varies depending on the instantaneous value of the first error voltage signal 237 in comparison to the amplitude (i.e., the peak-peak value of a signal) of the sawtooth waveform input signal 215. In general, the first PWM clock signal 262 will be high for a portion of the clock cycle when the ramp portion of the sawtooth waveform input signal 215 is lower than the first error voltage signal 237 and will be low for the remainder of each clock cycle.

For example, in one implementation where the sawtooth waveform input signal 215 ranges between 0.0 volts and 1.0 volts, and the first error voltage signal 237 is 0.25 volts, during the portion of the clock cycle when the sawtooth waveform input signal 215 is less than 0.25 volts, then the first PWM clock signal 262 will be high, but during the portion of the clock cycle when the sawtooth waveform input signal 215 is greater than 0.25 volts, then the first PWM clock signal 262 will be low and the end result is that the first PWM clock signal 262 will be a square wave clock signal with a duty cycle of 25 percent. The value of the first error voltage signal 237 continuously changes depending on the value of output voltage ($V_{OUT}$) in comparison to the first reference voltage ($V_{REF1}$), which in turn changes the duty cycle of the first PWM clock signal 262. For instance, when the first error voltage signal 237 increases to 0.75 volts, then during the portion of the clock cycle when the first sawtooth waveform input signal is less than 0.75 volts, the first PWM clock signal 262 will be high and during the portion of the clock cycle when the first sawtooth waveform input signal 215 is greater than 0.75 volts, the first PWM clock signal 262 will be low and the end result is that first PWM clock signal 262 will be a square wave clock signal with a duty cycle of 75 percent.

The second control loop 250 is separate or distinct from the first control loop 230, and operates simultaneously or concurrently with the first control loop 230. The second control loop 250 regulates the input current ($I_{IN}$) so that the input voltage ($V_{IN}$) does not fall below the second reference voltage ($V_{REF2}$) input 252. In other words, the second control loop 250 maintains the input voltage ($V_{IN}$) at or above (i.e., greater than or equal to) the second reference voltage ($V_{REF2}$) input 252, which is set to a desired minimum value of the input voltage ($V_{IN}$). This way the second control loop 250 prevents the load power from increasing to a value that pulls the input voltage ($V_{IN}$) below the regulation point that is specified by the second reference voltage ($V_{REF2}$) input 252. Thus, even as the resistance 294 of the load 290 decreases, the input voltage ($V_{IN}$) will not decrease below a desired value specified by the second reference voltage ($V_{REF2}$) input 252. Rather, the output voltage ($V_{OUT}$) will decrease to limit the fall in input voltage ($V_{IN}$) to prevent the input voltage ($V_{IN}$) from decreasing below a value at which the load attempts to consume more power than is desired or available from the DC power source 210.

In one implementation, the second reference voltage ($V_{REF2}$) input 252 is set to a value that is greater than or equal to approximately one-half of the open circuit voltage ($V_{OC}$) of the DC power source 210 such that the second control loop 250 prevents the input voltage ($V_{IN}$) from falling below one-half of the open circuit voltage ($V_{OC}$) of the DC power source 210. The second control loop 250 prevents the load 290 from pulling too much input current ($I_{IN}$) from the DC power source 210, and thereby prevents the input voltage ($V_{IN}$) from dropping below a value that would result in even less power delivered to the load 290.

In another implementation when the DC power source 210 is a photovoltaic cell, the second reference voltage ($V_{REF2}$) input 252 is set to a value approximately 90% of the open circuit voltage ($V_{OC}$) of the DC power source 210 such that the second control loop 250 prevents the input voltage ($V_{IN}$) from falling below 90% of the open circuit voltage ($V_{OC}$) of the DC power source 210. The second control loop 250 prevents the load 290 from pulling too much input current from the DC power source 210, and thereby controls the input voltage ($V_{IN}$) to transfer nearly the maximum possible power to the DC-to-DC converter 220.

One input of the second control loop 250 is coupled to the DC power source 210 so that it receives the input voltage ($V_{IN}$) from the DC power source 210, another input of the second control loop 250 receives a second reference voltage ($V_{REF2}$) 252 and another input of the second control loop 250 receives the inverse sawtooth waveform input signal 217. The inverse sawtooth waveform input signal 217 (also called a "reverse" sawtooth waveform) cyclically ramps downward and then sharply rises. One period of the inverse sawtooth waveform input signal 217 corresponds to a clock cycle that starts when the inverse sawtooth waveform input signal 217 begins rising and ends when the inverse sawtooth waveform input signal 217 sharply drops. The output signal 272 of the second control loop 250 is coupled to AND gate 275. As explained in more detail below, the output signal 272 is PWM clock signal 272 (i.e., a square wave clock signal) having a second duty cycle associated therewith. In the exemplary implementation illustrated in FIG. 2, the second control loop 250 includes an error amplifier circuit 254, 256, 258 that is coupled to a duty cycle generator 270. In this exemplary implementation, the error amplifier circuit 254, 256, 258 includes an operational amplifier 256 with stability compensation component(s) 258, but can be implemented using other error amplifier circuits that are known in the art. Similarly, although the duty cycle generator 270 is illustrated as a comparator, the duty cycle generator 270 can also be implemented using other circuits that are known in the art.

The error amplifier circuit 254, 256, 258 is designed to receive the input voltage ($V_{IN}$) and the second reference voltage ($V_{REF2}$) input 252 that represents a desired minimum value of the input voltage ($V_{IN}$). In one implementation, the second reference voltage ($V_{REF2}$) input 252 is set to a value greater than or equal to approximately one-half of the open circuit voltage ($V_{OC}$) available from the power source 210; this prevents the input voltage ($V_{IN}$) from falling below one-half of the open circuit voltage ($V_{OC}$) of the power source 210 and therefore prevents the load 290 from drawing more power than is available or is desired from the DC power source 210. Based on the input voltage ($V_{IN}$) and the second reference voltage ($V_{REF2}$) input 252, the error amplifier circuit 254, 256, 258 generates a second error voltage signal 257. More specifically, the second error voltage signal 257 is determined based on the "differences" between the input voltage ($V_{IN}$) and the second reference voltage ($V_{REF2}$) input 252 during the operation of the circuit 200, where the differences can be based on all previous time values of the input voltage ($V_{IN}$) and the second reference voltage ($V_{REF2}$) input 252 during the operation of the circuit 200.

The duty cycle generator 270 continuously compares the second error voltage signal 257 to the inverse sawtooth waveform input signal 217, and continuously generates a second PWM clock signal 272 (i.e., a square wave clock signal). The second PWM clock signal 272 has a second duty cycle associated therewith that varies depending on the instantaneous value of the second error voltage signal 257 in comparison to the amplitude (i.e., the peak-peak value of a signal) of the inverse sawtooth waveform input signal 217. In general, the second PWM clock signal 272 will be high when the inverse sawtooth waveform input signal 217 is greater than the second error voltage signal 257 and low when the inverse sawtooth waveform input signal 217 is less than the second error voltage signal 257.

For example, in one implementation, where the inverse sawtooth waveform input signal 217 ranges between 0.0 volts and 1.0 volts, and where the error voltage signal 257 is 0.66 volts during the portion of the clock cycle when the inverse sawtooth waveform input signal 217 is greater than 0.66 volts, then the second PWM clock signal 272 will be high, but during the portion of the clock cycle when the inverse sawtooth waveform input signal 217 is smaller than 0.66 volts, then the second PWM clock signal 272 will be low and the end result is that the second PWM clock signal 272 will be a square wave clock signal with a duty cycle of 33 percent. The value of the second error voltage signal 257 continuously changes depending on the values of output voltage ($V_{OUT}$) in comparison to the second reference voltage ($V_{REF2}$) input 252, which in turn changes the duty cycle of the second PWM clock signal 272. For instance, when the second error voltage signal 257 increases to 0.75 volts, then during the portion of the clock cycle when the inverse sawtooth waveform input signal 217 is greater than 0.75 volts, the second PWM clock signal 272 will be high, and during the portion of the clock cycle when the inverse sawtooth waveform input signal 217 is less than 0.75 volts, the second PWM clock signal 272 will be low and the end result is that second PWM clock signal 272 will be a square wave clock signal with a duty cycle of 25 percent.

In one implementation, the sawtooth waveform input signal 215 and the inverse sawtooth waveform input signal 217 are synchronized so that the ramps initialize and terminate at the same time (i.e., at the beginning of each clock cycle).

The first PWM clock signal 262 is at the same frequency and in-phase with the second PWM clock signal 272 such that the two PWM clock signals 262, 272 start at each clock edge and generally finish at a different times during each clock cycle when the clock signals 262, 272 have different duty cycles. The inputs to the AND gate 275 are the first PWM clock signal 262 and the second PWM clock signal 272. In this implementation, the first PWM clock signal 262 is "ANDed" with the second PWM clock signal 272.

When the AND gate 275 performs an AND operation on the first PWM clock signal 262 and the second PWM clock signal 272, the AND gate has the property of automatically selecting between the one of the first PWM clock signal 262 and the second PWM clock signal 272 having a minimum duty cycle. As used herein, the term "duty cycle" or "duty cycle value" refer to the pulse duration of a rectangular PWM signal divided by the pulse period of the rectangular PWM signal (i.e., fraction of time that the PWM signal is high during a period), and the term "minimum duty cycle" or "lower duty cycle" refers to a lowest "duty cycle" value among two PWM signals with one having a first duty cycle and another having a second duty cycle. The AND gate 275 combines the first PWM clock signal 262 and the second PWM clock signal 272 so that the one of the first PWM clock signal 262 and the second PWM clock signal 272 having the lowest duty cycle value is selected and output. As will be explained further below, when the AND gate 275 selects the first PWM clock signal 262 (i.e., when the first duty cycle is lower), the dual loop DC-to-DC converter 220 operates in a first mode of operation where the first control loop 230 controls the output voltage ($V_{OUT}$) generated by the dual loop DC-to-DC converter 220 by regulating the output voltage ($V_{OUT}$) with respect to the first reference voltage ($V_{REF1}$). By contrast, when the AND gate 275 selects the second PWM clock signal 272 (i.e., when the second duty cycle is lower), the dual loop DC-to-DC converter 220 operates in a second mode of operation where the second control loop 250 controls the input voltage ($V_{IN}$) to the dual loop DC-to-DC converter 220 by regulating the input voltage ($V_{IN}$) with respect to the second reference voltage ($V_{REF2}$) input 252. The control loop 230, 250 that is not selected effectively loses its control function while the other control loop 250, 230 has the lower duty cycle value and is selected by the AND gate 275.

To explain further, the AND gate 275 continuously determines which one of the first PWM clock signal 262 and the second PWM clock signal 272 have a minimum (i.e., lower) duty cycle, and generates an PWM output signal 277 having a modulated duty cycle equal to the minimum (e.g., lower) duty cycle. In other words, the AND gate 275 automatically selects or "computes" which one of the first PWM clock signal 262 and the second PWM clock signal 272 has the lower or "minimum" duty cycle, and continuously outputs an PWM output signal 277 that has a minimum duty cycle, where the minimum duty cycle is equal to the "minimum of" or "lower of" the first duty cycle (of the first PWM clock signal 262) and the second duty cycle (of the second PWM clock signal 272).

This behavior of the AND gate 275 allows the AND gate 275 to generate an PWM output signal 277 that has either (1) the first duty cycle when the DC-to-DC converter 220 is operating in a first mode (i.e., when the first control loop 230 regulates the output voltage ($V_{OUT}$)) or (2) the second duty cycle when the DC-to-DC converter 220 is operating in a second mode (i.e., when the second control loop 250 regulates the input voltage ($V_{IN}$)).

For example, if the output voltage ($V_{OUT}$) is too high, then first error voltage signal 237 will decrease, which will decrease the duty cycle of the first PWM clock signal 262. Eventually the first PWM clock signal 262 will have the lower duty cycle value, and when this happens the AND gate 275 will generate a PWM output signal 277 that has the first duty cycle. As a result, the output power switch stage 282 will be turned on for a shorter amount of time and the output voltage ($V_{OUT}$) will decrease towards a lower value.

By contrast, if the input voltage ($V_{IN}$) is too low because the load 290 is drawing too much current from the DC power source 210 (and thus causing the input voltage ($V_{IN}$) to drop/decrease below a threshold voltage ($V_{REF2}$)), then second error voltage signal 257 will increase, which will decrease the duty cycle of the second PWM clock signal 272. Eventually the second PWM clock signal 272 will have the lower duty cycle value. This indicates that the load 290 is drawing too much input current ($I_{IN}$) and causing the input voltage ($V_{IN}$) to drop below a threshold. When this happens the AND gate 275 will generate a PWM output signal 277 that has the second duty cycle. As a result, the output power switch stage 280 will be turned on for a shorter amount of time and the input voltage ($V_{IN}$) will increase towards the desired value as less input current ($I_{IN}$) is consumed.

The output power switch stage circuit 280 is designed to supply the desired output voltage ($V_{OUT}$) to the load 290. The output voltage ($V_{OUT}$) generated by the output power switch stage circuit 280 varies based on the duty cycle the PWM output signal 277 generated by the AND gate 275. In the exemplary implementation illustrated in FIG. 2, the output power switch stage circuit 280 is a boost converter (or step-up DC-to-DC converter) that produces an output DC voltage ($V_{OUT}$) greater than its input DC voltage ($V_{IN}$). In the exemplary implementation illustrated in FIG. 2, the power switch stage circuit 280 comprises an inductor 284 that receives the input current ($I_{IN}$) and generates a first voltage signal 285, an active NMOS transistor 282 and a diode 286 (or other switch) coupled to the active NMOS transistor 282. Although not illustrated, additional components such as filters made of capacitors and/or inductors may be added to the output of the output power switch stage circuit 280 to reduce output voltage ripple.

The inductor 284 resists changes in the input current ($I_{IN}$). When being charged inductor 284 acts as a store and absorbs energy, and when being discharged, inductor 284 acts as an energy source. During the discharge phase, inductor 284 delivers its stored energy at a voltage level 285 with the value required to cause diode 286 to conduct the inductor current to the output of DC-to-DC converter 220 thus allowing different input and output voltages.

The output power switch stage circuit 280 operates in two distinct states. When the active NMOS transistor 282 is on or conducting, the current ($I_{IN}$) in the inductor increases, and when the active NMOS transistor 282 is off or non-conducting, energy accumulated during the on-state is transferred through the diode 286 to the load 200. When the active NMOS transistor 282 receives the PWM output signal 277 from the AND gate 275, the active NMOS transistor 282 inverts it to generate an inverted PWM output signal 283. When the active NMOS transistor 282 is on, the inverted PWM output signal 283 is low and this causes current flowing through inductor 284 to increase and store energy. When the active NMOS transistor 282 is off, the inverted PWM output signal 283 is high, and this causes energy stored in the inductor 284 to be delivered through another switch 286 (illustrated as a diode 286) as output signal 285, which generates the output voltage ($V_{OUT}$) for the load 290.

Figure 3:
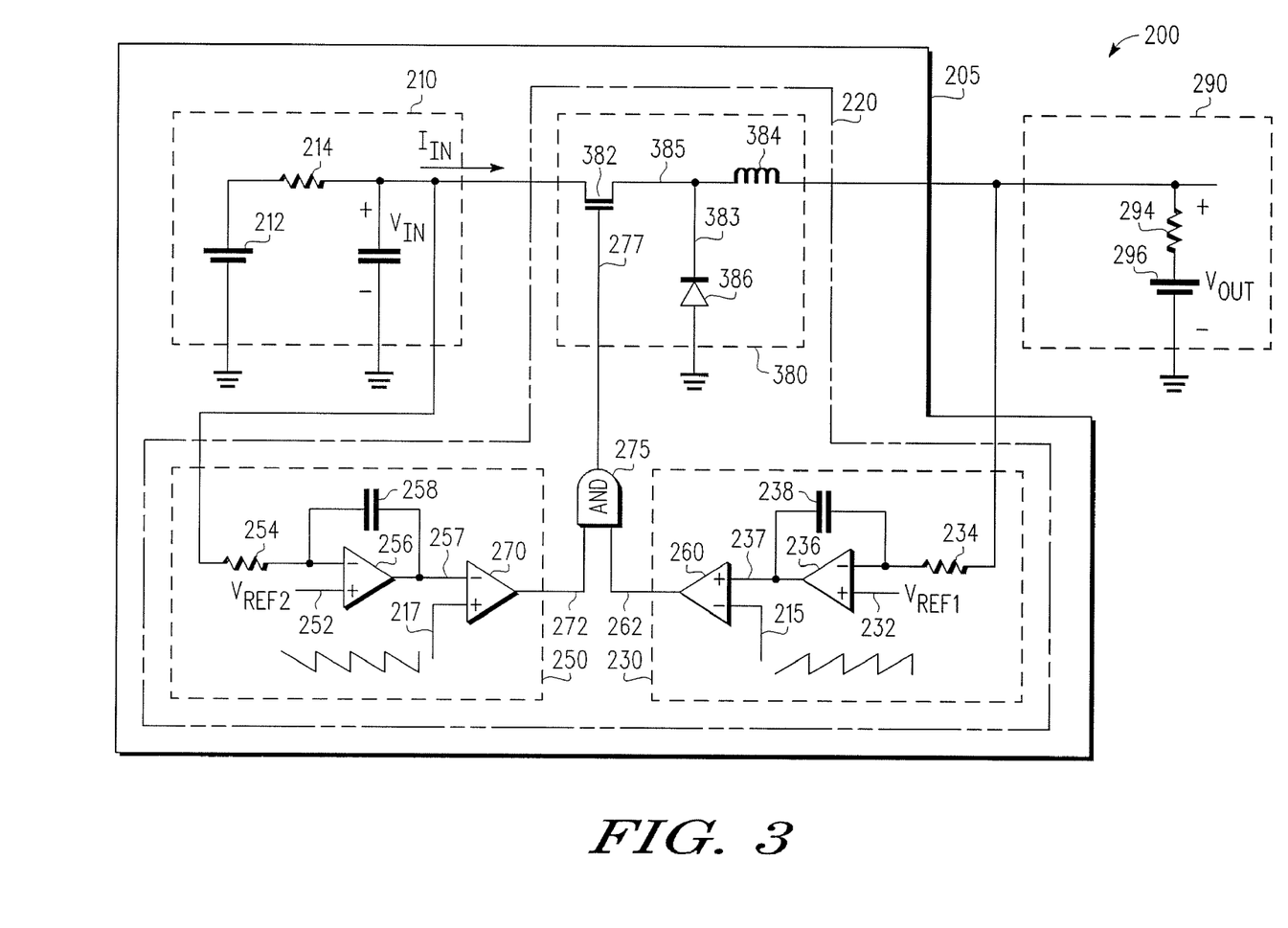
FIG. 3 is a circuit schematic which illustrates a system that includes a circuit for supplying an output voltage ($V_{OUT}$) to a load in accordance with another exemplary embodiment of the present invention.

In other implementations, such as that illustrated in FIG. 3, the output power switch stage circuit 280 can be implemented using a buck converter 380 (or step-down DC-to-DC converter) that produces an output DC voltage ($V_{OUT}$) less than its input DC voltage ($V_{IN}$), in which case the components that make up the output power switch stage circuit 380 are swapped by replacing the diode 286 with an inductor 384, the switch 283 with a diode 386, and the inductor 284 with a switch 383.

The buck converter 380 alternates between connecting the inductor 384 to input voltage ($V_{IN}$) to store energy in the inductor 384 and discharging the inductor 384 into the load 290. When the active NMOS transistor 382 receives the PWM output signal 277 from the AND gate 275, the active NMOS transistor 382 generates a PWM output signal 283. When the active NMOS transistor 282 is off (i.e., not conducting), the inductor 384 current decreases, but still flows to the load 290, thus providing output power from the energy stored in the inductor 384. As such, when the active NMOS transistor 282 is off (i.e., not conducting), the output voltage ($V_{OUT}$) decreases. When the PWM output signal 277 is high the active NMOS transistor 282 is on (i.e., conducting), and the inductor energy builds up as its current increases, and this current flows to the load 290 providing output power from the energy stored in the inductor 384. Because the diode 386 is reversed-biased no current flows through the diode 386. As such, when, the active NMOS transistor 282 is on, the output voltage ($V_{OUT}$) increases.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient roadmap for implementing the described embodiment or embodiments. It should also be understood that various changes can be made in the function and arrangement of elements without departing from the scope defined by the claims, which includes known equivalents and foreseeable equivalents at the time of filing this patent application.

What is claimed is:

1. A method for converting a DC input voltage ($V_{IN}$) to a DC output voltage ($V_{OUT}$), the method comprising the steps of:

generating a first pulse width modulated (PWM) clock signal having a first duty cycle associated therewith and a second PWM clock signal having a second duty cycle associated therewith;

continuously determining which one of the first duty cycle of the first PWM clock signal and the second duty cycle of the second PWM clock signal has a lower duty cycle value;

generating a PWM output signal having a modulated duty cycle equal to the one of the first duty cycle and the second duty cycle that is determined to have the lower duty cycle value; and concurrently maintaining, based on the PWM output signal, the output voltage ($V_{OUT}$) at less than or equal to a desired maximum value of the output voltage ($V_{OUT}$) and the input voltage ($V_{IN}$) at greater than or equal to a desired minimum value of the DC input voltage ($V_{IN}$).

2. A dual loop DC-to-DC converter designed to convert a DC input voltage ($V_{IN}$) to a DC output voltage ($V_{OUT}$), comprising:

a first control loop designed to maintain the output voltage ($V_{OUT}$) less than or equal to a first reference voltage ($V_{REF1}$) input that represents a desired maximum value of the output voltage ($V_{OUT}$), and to generate a first pulse width modulated (PWM) clock signal having a first duty cycle associated therewith;

a second control loop that operates concurrently with the first control loop, wherein the second control loop is designed to maintain the input voltage ($V_{IN}$) greater than or equal to a second reference voltage ($V_{REF2}$) input that represents a desired minimum value of the DC input voltage ($V_{IN}$), and to generate a second PWM clock signal having a second duty cycle associated therewith; and a duty cycle selection module designed to: continuously determine which one of the first duty cycle of the first PWM clock signal and the second duty cycle of the second PWM clock signal has a lower duty cycle value; and continuously generate a PWM output signal having a modulated duty cycle equal to the one of the first duty cycle and the second duty cycle that is determined to have the lower duty cycle value.

3. A dual loop DC-to-DC converter according to claim 2, wherein the first control loop adjusts the output voltage ($V_{OUT}$) to maintain the output voltage ($V_{OUT}$) at the first reference voltage ($V_{REF1}$) input when the duty cycle selection module determines that the first duty cycle of the first PWM clock signal has the lower duty cycle value, and wherein the second control loop regulates input current ($I_{IN}$) to maintain the input voltage ($V_{IN}$) at the second reference voltage ($V_{REF2}$) input when the duty cycle selection module determines that the second duty cycle of the second PWM clock signal has the lower duty cycle value.

4. A system, comprising:

a DC power source that provides a DC input voltage ($V_{IN}$) and supplies an input current ($I_{IN}$);

a dual loop DC-to-DC converter coupled to the DC power source and designed to convert the DC input voltage ($V_{IN}$) to a DC output voltage ($V_{OUT}$); and a load coupled to the dual loop DC-to-DC converter and designed to receive the DC output voltage ($V_{OUT}$), wherein the dual loop DC-to-DC converter comprises:

a first reference voltage ($V_{REF1}$) input that represents a desired maximum value of the output voltage ($V_{OUT}$);

a second reference voltage ($V_{REF2}$) input that represents a desired minimum value of the input voltage ($V_{IN}$);

a first control loop designed to maintain the output voltage ($V_{OUT}$) less than or equal to the first reference voltage ($V_{REF1}$) input, and to generate a first pulse width modulated (PWM) clock signal having a first duty cycle associated therewith;

a second control loop that operates concurrently with the first control loop, wherein the second control loop is designed to maintain the input voltage ($V_{IN}$) greater than or equal to the second reference voltage ($V_{REF2}$) input, and to generate a second PWM clock signal having a second duty cycle associated therewith; and a duty cycle selection module designed to: continuously determine which one of the first duty cycle of the first PWM clock signal and the second duty cycle of the second PWM clock signal has a lower duty cycle value; and to continuously generate a PWM output signal having a modulated duty cycle equal to the one of the first duty cycle and the second duty cycle that is determined to have the lower duty cycle value.

5. A system according to claim 4, wherein the second control loop is designed to maintain the input voltage ($V_{IN}$) greater than or equal to the second reference voltage ($V_{REF2}$) input by regulating the input current ($I_{IN}$) to prevent the input voltage ($V_{IN}$) from decreasing below the second reference voltage ($V_{REF2}$).

6. A system according to claim 4, wherein the first reference voltage ($V_{REF1}$) input is set to a value greater than an open circuit voltage of the load, and wherein the second reference voltage ($V_{REF2}$) input is set to a value that is greater than or equal to approximately one-half of the open circuit voltage ($V_{OC}$) of the DC power source.

7. A system according to claim 6, wherein the second control loop is designed to maintain the input voltage ($V_{IN}$) greater than or equal to the second reference voltage ($V_{REF2}$) input to prevent the input voltage ($V_{IN}$) from decreasing below approximately one-half of the open circuit voltage ($V_{OC}$) of the DC power source.

8. A system according to claim 4, wherein the first reference voltage ($V_{REF1}$) input is set to a value greater than an open circuit voltage of the load, and wherein the second reference voltage ($V_{REF2}$) input is set to a value that is approximately equal to ninety percent of the open circuit voltage ($V_{OC}$) of the DC power source.

9. A system according to claim 8, wherein the second control loop is designed to maintain the input voltage ($V_{IN}$) greater than or equal to the second reference voltage ($V_{REF2}$) input to prevent the input voltage ($V_{IN}$) from decreasing below ninety percent of the open circuit voltage ($V_{OC}$) of the DC power source.

10. A system according to claim 4, wherein the duty cycle selection module comprises:

an AND gate designed to perform an AND operation on the first PWM clock signal and the second PWM clock signal and automatically generate the PWM output signal having a modulated duty cycle equal to the one of the first duty cycle of the first PWM clock signal and the second duty cycle of the second PWM clock signal that has the lower duty cycle value.

11. A system according to claim 10, wherein the AND gate is designed to automatically determine which one of the first PWM clock signal and the second PWM clock signal has a lower duty cycle value, and to continuously output the PWM output signal that has the lower duty cycle value.

12. A system according to claim 4, wherein the first control loop adjusts the output voltage ($V_{OUT}$) to maintain the output voltage ($V_{OUT}$) at the first reference voltage ($V_{REF1}$) input when the duty cycle selection module determines that the first duty cycle of the first PWM clock signal has the lower duty cycle value.

13. A system according to claim 4, wherein the second control regulates the input current ($I_{IN}$) to maintain the input voltage ($V_{IN}$) equal to the second reference voltage ($V_{REF2}$) input when the duty cycle selection module determines that the second duty cycle of the second PWM clock signal has the lower duty cycle value.

14. A system according to claim 4, further comprising:

a sawtooth waveform input signal;

and wherein the first control loop receives the sawtooth waveform input signal, the first reference voltage ($V_{REF1}$) input and feedback regarding the output voltage ($V_{OUT}$), and wherein the first control loop comprises:

an error amplifier circuit designed to generate a first error voltage signal based on the output voltage ($V_{OUT}$) and the first reference voltage ($V_{REF1}$) input; and a duty cycle generator, coupled to the error amplifier circuit, and designed to continuously compare the first error voltage signal to the sawtooth waveform input signal and continuously generate the first PWM clock signal having the first duty cycle associated therewith that varies depending on an instantaneous value of the first error voltage signal in comparison to an amplitude of the sawtooth waveform input signal.

15. A system according to claim 4, further comprising:

an inverse sawtooth waveform input signal;

and wherein the second control loop receives the inverse sawtooth waveform input signal, the second reference voltage ($V_{REF2}$) input and feedback regarding the input voltage ($V_{IN}$) from the DC power source, and wherein the second control loop comprises:

a second error amplifier circuit designed to generate a second error voltage signal based on the input voltage ($V_{IN}$) and the second reference voltage ($V_{REF2}$) input; and a second duty cycle generator, coupled to the second error amplifier circuit, and designed to continuously compare the second error voltage signal to the inverse sawtooth waveform input signal and to continuously generate the second PWM clock signal having the second duty cycle associated therewith that varies depending on an instantaneous value of the second error voltage signal in comparison to an amplitude of the inverse sawtooth waveform input signal.

16. A system according to claim 4, further comprising:

an output power switch stage circuit designed to receive the input voltage ($V_{IN}$) and the PWM output signal and to generate the desired output voltage ($V_{OUT}$) for the load based on the input voltage ($V_{IN}$) and the PWM output signal.

17. A system according to claim 16, wherein the output power switch stage circuit comprises a boost converter, the boost converter comprising:

an inductor that receives the input current ($I_{IN}$);

a transistor coupled to the inductor, wherein the transistor receives the PWM output signal from the duty cycle selection module and inverts the PWM output signal to generate an inverted PWM output signal; and a diode coupled to the inductor and to the transistor, wherein the input current ($I_{IN}$) flowing to the inductor increases when the transistor is conducting causing the inductor to store energy, and wherein stored energy accumulated in the inductor when the transistor was conducting is transferred through the diode to the load when the transistor is non-conducting to provide the output voltage ($V_{OUT}$) for the load.

18. A system according to claim 16, wherein the output power switch stage circuit comprises a buck converter, the buck converter comprising:

a transistor that receives the input current ($I_{IN}$) and the PWM output signal from the duty cycle selection module and generates another PWM output signal;

a diode coupled to the transistor; and an inductor coupled to the transistor and to the diode, wherein the inductor stores energy when the transistor is conducting and also provides a current to the load to provide the output voltage ($V_{OUT}$) at the load, and wherein the stored energy in the inductor is transferred through the diode to also provide the output voltage ($V_{OUT}$) at the load when the transistor is not conducting.

19. A system according to claim 4, wherein the sawtooth waveform input signal is synchronized with the inverse sawtooth waveform input signal to begin at a leading edge of the same clock signal.

20. A system according to claim 4, wherein the load comprises:

a battery having a resistance associated therewith, wherein the battery uses the output voltage ($V_{OUT}$) as a power supply to charge the battery, and wherein the resistance of the battery changes depending on an amount of charge stored by the battery as the battery state of charge changes.

* * * * *